United States Patent [19]

Hatakeyama et al.

[11] 3,805,133

[45] Apr. 16, 1974

[54] CONTROL SYSTEM FOR INDUCTION MOTORS

[75] Inventors: Takanobu Hatakeyama; Seiya Shima, both of Katsuta, Japan

[73] Assignee: Hitachi, Ltd., Tokyo, Japan

[22] Filed: Aug. 3, 1973

[21] Appl. No.: 385,336

[52] U.S. Cl................ 318/211, 318/227, 318/230
[51] Int. Cl.............................................. H02p 3/20
[58] Field of Search........................... 318/209–212, 318/227, 230

[56] References Cited
UNITED STATES PATENTS
3,514,682 5/1970 Corey .................................. 318/212
3,708,734 1/1973 Rowe.................................. 318/212

Primary Examiner—Gene Z. Rubinson
Attorney, Agent, or Firm—Craig & Antonelli

[57] ABSTRACT

A simple and inexpensive control system for induction motors comprising a three phase induction motor, a three phase AC source, a rectifying bridge circuit consisting of a pair of thyristers and a pair of rectifying elements, a first contactor group for connecting an antiparallel circuit consisting of the thyristors in the bridge circuit between one terminal of the AC source and one terminal of the induction motor at the time of motoring of the induction motor, a second contactor group for connecting the AC terminals of the bridge circuit to two terminals of the AC source and connecting the DC terminals of the bridge circuit to two terminals of the induction motor at the time of braking of the induction motor, a single phase shifter for ignition controlling the pair of thyristors, means for supplying the difference between two line voltages of the AC source to the phase shifter at the time of motoring of the motor, and means for supplying one line voltage of the AC source to the phase shifter at the time of braking of the motor.

5 Claims, 6 Drawing Figures

CONTROL SYSTEM FOR INDUCTION MOTORS

The present invention relates to a control system for induction motors, and more particularly, to an improvement in the system for controlling both motoring and braking of induction motors.

Induction motors are being used in various fields of industry due to their general utility. In particular, they have been widely employed for uses for which a precise speed control is unnecessary. However, with the development of the thyristor, it has become possible to use them for a considerable precise control by combining them with the thyristor.

For example, as for the elevator, the popular type of elevator has employed the induction motor, while the high class type of elevator has employed the DC motor capable of easily effecting a precise speed control. However, since considerable precision can be ensured by utilizing the thyristor for the speed control of the induction motor, the use of the induction motor is gradually spreading.

Among the various modes in which the speed of the induction motor at the motoring time is controlled by the use of the thyristor, the primary voltage control in which a thyristor is connected between the AC source and the induction motor is the most prevailing one. As the primary voltage control, there are two manners in which an anti-parallel circuit of a pair of thyristors is employed and an anti-parallel circuit of a thyristor and a rectifying element is employed. Further, there are other modes of one phase control in which the anti-parallel circuit is connected only to one phase, of two phase control in which the anti-parallel circuit is connected to each of two phases, and of three phase control in which the anti-parallel circuit is connected to each of all three phases.

On the other hand, for the speed control of the induction motor at the time of braking by the use of the thyrister, the DC control in which DC power is applied between any two terminals is the most prevailing.

For the speed control of the induction motor from motoring to braking by the combination of the one phase control by the anti-parallel circuit of a pair of thyristers and the DC braking control by the controllable rectifying circuit including the thyrister, a pair of thyristers are necessary for motoring, two to four sets of thyristers are necessary for braking, and at least two sets of phase shifters are necessary for ignition or firing control of each thyrister. Consequently, there are the disadvantages that the system is complicated and expensive.

An object of the present invention is to provide a speed control system for controlling the speed of the induction motor from motoring to braking by the combination of the one phase control and the DC braking control with a simple and inexpensive construction.

A feature of the control system for the induction motor according to the present invention is that it comprises a three phase AC source, a three phase induction motor, a rectifying bridge circuit including at least a pair of thyristers, a first contactor group for connecting the anti-parallel circuit of the pair of thyristers in the bridge circuit between one terminal of the AC source and one terminal of the induction motor at the time of motoring of the induction motor, and a second contactor group for connecting the AC side of the rectifying bridge to two terminals of the AC source and connecting the DC side of the rectifying bridge to two terminals of the induction motor at the time of braking.

By this construction only a pair of thyristers are sufficient for the main circuit of the induction motor throughout from motoring to braking.

Another feature of the present invention is that the control system comprises a single phase shifter for ignition controlling the pair of thyristers, means for supplying the difference between two line voltages of the three phase AC source to the phase shifter at the time of motoring, and means for supplying one line voltage of the three phase AC source to the phase shifter at the time of braking.

By this construction the induction motor can be controlled only by a single phase shifter throughout from motoring to braking.

The above and other objects, features and advantages of the present invention will become more apparent from the following detailed description of the preferred embodiment of the present invention when taken in conjunction with the accompanying drawings, in which:

FIG. 3b is a torque characteristic of the circuit of FIG. 3a;

FIG. 4b is a torque characteristic of the circuit of FIG. 4a.

Though the present invention can be applied to many uses in which the torque of the induction motor is controlled at the time of motoring and braking, the following description will be made about the application to the driving system of the elevator by way of example only.

Figure 1:
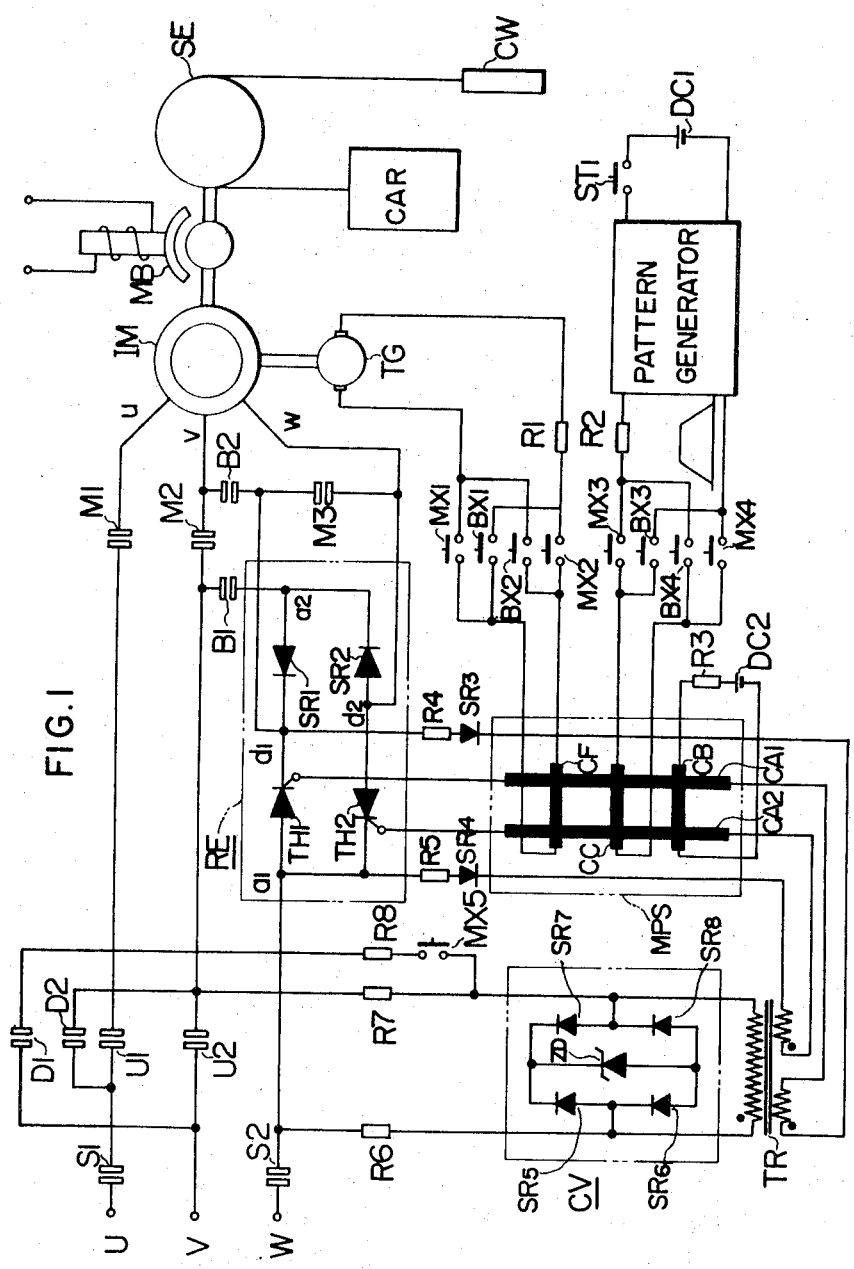
FIG. 1 is an embodiment of the control system for the induction motor according to the present invention applied to an elevator.

In FIG. 1, start contactors S1 and S2, up running or ascending operation contactors U1 and U2 which are closed at the time of up running of the elevator, and down running or descending operation contactors D1 and D2 which are closed at the time of down running are connected to a three phase AC source, U,V and W. The terminals U and V of the three phase AC source are further connected to two terminals of a three phase induction motor IM for elevator driving through contactors M1 and M2. The remaining source terminal W is connected to a first AC terminal $a1$ of a controllable rectifying bridge RE through the contactor 52. A contactor B1 is provided for connecting the other AC terminal $a2$ of this bridge RE to the source terminal U or V. A contactor M3 is provided for short-circuiting the DC terminals $d1$ and $d2$ of the bridge curcuit RE. A contactor B2 is provided for connecting the DC terminal $d1$ to one terminal $v$ of the induction motor IM. The other DC terminal $d2$ is directly connected to another terminal $w$ of the induction motor IM. The bridge RE is comprised of a pair of thyristers TH1 and TH2 and a pair of rectifying elements SR 1 and SR2.

The above is the main circuit construction of the three phase induction motor for elevator driving. The contactors M1, M2, and M3 are closed by an exciting coil M (FIG. 2) which operates during the time that the induction motor is to be subjected to motoring, while the contactors B1 and B2 are closed by an exciting coil B (FIG. 2) which operates during the time that the motor is to be subjected to braking. Consequently, both groups of contactors never close simultaneously. The operation of these contactors will be made hereinbelow.

The induction motor IM is connected to an elevator sheave SE through an electro-magnetic brake MB. An elevator car CA and a counter weight CW are suspended from the sheave SE on each side thereof.

The speed of the three phase induction motor IM is detected by a tachometer generator TG and transmitted to the feedback coil CF of a magnetic phase shifter MPS through a resistor R1 and change-over contactors MX1, MX2, BX1 and BX2. The control coil CC of the magnetic phase shifter MPS is supplied with the output of a pattern generator PG through a resistor R2 and change-over contactors MX3, MX4, BX3 and BX4. The pattern generator PG is connected to a DC source DC1 through a switch ST1 and produces a speed instruction which increases with time. This speed instruction commonly decreases at the time of deceleration or braking in accordance with the position of the elevator.

The magnetic phase shifter MPS can compare the speed instruction supplied from the pattern generator PG and the feedback speed supplied from the tachometer generator TG. In order to bias the region which can utilize the characteristic of the magnetic phase shifter MPS, a bias coil CB is connected in series with a DC source DC2 and a resistor R3 as is commonly made.

The magnetic phase shifter MPS include a pair of AC windings CA1 and CA2 and appropriately phase shifts the voltage of the secondary winding of a transformer TR to supply the phase shifted secondary voltage between the gate and cathode of the thyristers TH1 and TH2 through resistors R4 and R5 and back or reverse current preventing rectifying elements SR3 and SR4.

A constant voltage circuit CV can make the output of the transformer TR into a rectangular wave of a constant amplitude. Consequently, the characteristics of the magnetic phase shifter MPS can be improved. The constant voltage circuit CV consists of a rectifying bridge composed of rectifying elements SR5, SR6, SR7 and SR8 and a Zener diode ZD connected on the DC side of the latter bridge.

The primary winding of the transformer TR is connected between the lines U-W or V-W of the three phase AC source through the constant voltage circuit CV and further through resistors R6 and R7. When a switch MX5 which is to be closed at the time of motoring of the induction motor IM is closed, a resistor R8 is connected to the source terminal V, so that the difference between the U-W line voltage and the V-W line voltage is supplied to the transformer TR. For this purpose the resistances of the resistors R7 and R8 are selected to be the same.

Figure 2:
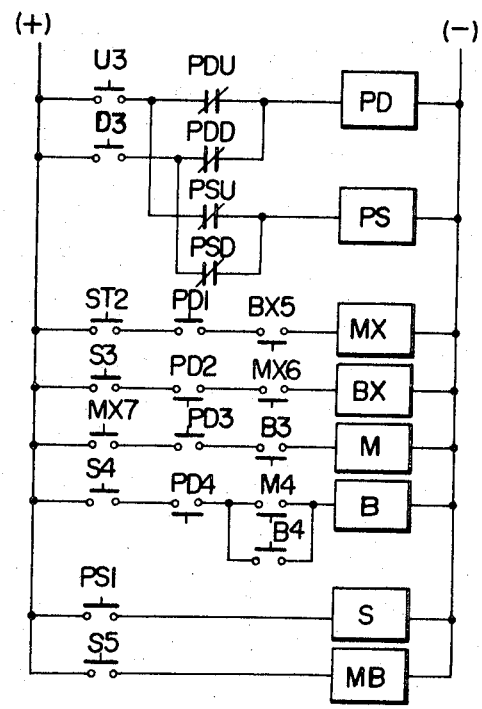
FIG. 2 is a circuit diagram of the relay sequence in the circuit of FIG. 1.

A description will next be made of the operation of the system of FIG. 1 referring to FIG. 2. Here, it is to be noted that the circuit of FIG. 2 is very simplified and is considerably different from the actual relay sequence for the elevator.

When the direction in which the elevator is to travel is determined by landing call or car call, contactors U1, U2 and a contact U3 are closed when the elevator is to go up, while contactors D1, D2 and a contact D3 are closed when it is to go down. Here, it is assumed that the elevator is to go up for the sake of description, in which case contacts PDU and PDD which are to be opened when the elevator car comes to the position where braking is to start, and contacts PSU and PSD which are to be opened when the elevator car comes to the position where it is to stop are all closed, so that a deceleration or braking relay PD is excited through the circuit (+)–U3–PDU–PD–(−)

while a stop relay PS is excited through the circuit (+)–U3–PSU–PS–(−)

In this state, if the contacts ST1 and ST2 are closed by the start instruction, the pattern generator PG in FIG. 1 starts to produce the speed instruction. And, at the same time, an acceleration or motoring preparation relay coil MX is energized, and the motoring contactor coil M is energized through the circuit (+)–MX7–PD3–B3–M–(−)

Figure 3A:
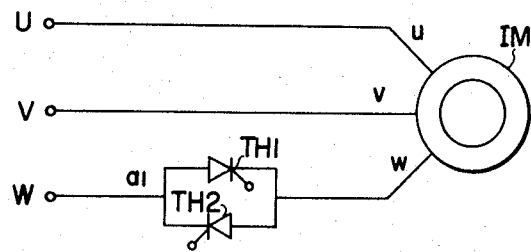
FIG. 3a is a schematic diagram of the main circuit of the system of FIG. 1 at the time of motoring.

Further, a start relay S and an electromagnetic brake coil MB are also excited. As a result, in the main circuit of FIG. 1 the contactors S1, S2, U1, U2, M1, M2, and M3 are closed to form the main circuit shown in FIG. 3a. In this example, the induction motor IM starts to move in the direction to make the elevator car go up.

On the other hand, since the contactors MX1, MX2, MX3, MX4, and MX5 in FIG. 1 are closed, the speed instruction and the feedback speed are compared by the magnetic phase shifter MPS to phase control the thyristers TH1 and TH2 in accordance with the difference therebetween. As a result, the speed of the elevator varies following the output of the pattern generator.

Figure 3B:
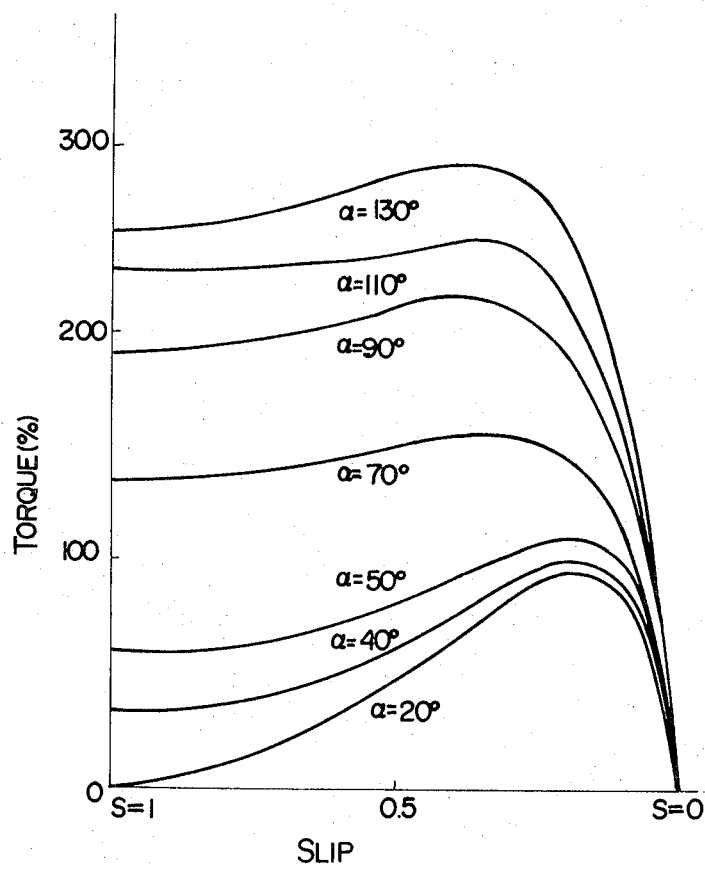

In this case, since the thyristers TH1 and TH2 are connected between the W-phase terminal of the three phase AC source and the terminal w of the induction motor IM, these thyristers are supplied with the difference voltage between the U-W line voltage and the V-W line voltage. Consequently, it is necessary that this difference voltage is also supplied, as the voltage source, to the magnetic phase shifter MPS which controls the thyristers. In fact, the primary winding of the transformer TR which is the power source of the phase shifter MPS is supplied with the U-W line voltage of the three phase AC source through the resistors R6 and R7 and with the V-W line voltage of the three phase AC source through the resistors R6 and R8 due to the closure of the contact MX5. Since the resistors R7 and R8 are of the same resistance as stated above, the primary winding of the transformer TR is provided with the difference voltage between the U-W line voltage and the V-W line voltage of the three phase AC source, which is transmitted to the magnetic phase shifter MPS. As a result, the voltage applied to the thyristers TH1 and TH2 and the voltage applied to the magnetic phase shifter MPS are synchronized with each other, so that a normal phase control, i.e., one phase control of the thyristers are possible. FIG. 3b shows slip vs. torque characteristic of the one phase control with the control phase angle α taken as a parameter.

When the elevator car runs and reaches the position at which braking is to start, a brake limit switch PDU opens. Consequently, the brake relay PD is deenergized to open the contacts PD1 and PD3 and to close the contacts PD2 and PD4. As a result, the motoring preparation relay coil MX and the motoring contactor coil M are deenergized, and instead the braking preparation relay coil BX and the braking contactor coil B are energized.

Figure 4A:
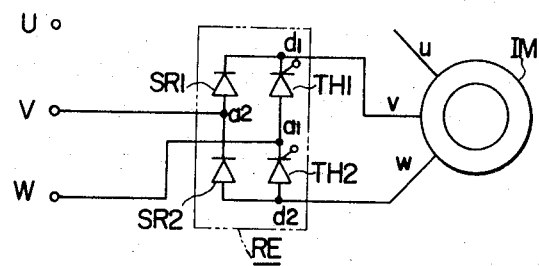
FIG. 4a is a schematic diagram of the main circuit of the system of FIG. 1 at the time of braking.

Consequently, since the contactors B1 and B2 alone are closed in the main circuit of the induction motor IM of FIG. 1, the circuit construction of FIG. 4a, i.e., a DC braking control circuit results.

On the other hand, in the system of FIG. 1, since all the contactors MX1, MX2, MX3, and MX4 are opened and all the contactors BX1, BX2, BX3, and BX4 are closed, the speed instruction and the feedback speed are of opposite polarities to each other in the motoring mode, which are compared by the magnetic phase shifter MPS to phase control the thyristors TH1 and TH2 in accordance with the difference therebetween. At this time, since the speed instruction, the output of the pattern generator PG, decreases as shown in FIG. 1, the speed of the elevator car decrease only due to the braking torque against its inertia to follow the speed instruction.

At this time, since the thyristors TH1 and TH2 are connected between the lines V and W of the three phase AC source, it is necessary to supply, as its voltage source, the V-W line voltage to the phase shifter MPS which controls these thyristors.

In fact, since the contact MX5 in FIG. 1 is open, the V-W line voltage is supplied to the primary winding of the transformer TR through the resistors R6 and R7 and is further supplied to the magnetic phase shifter MPS. Consequently, in braking mode also, the voltage supplied to the thyristors TH1 and TH2 and that supplied to the phase shifter MPS can be synchronized with each other, so that the control of the DC braking torque due to the phase control is possible.

Figure 4B:
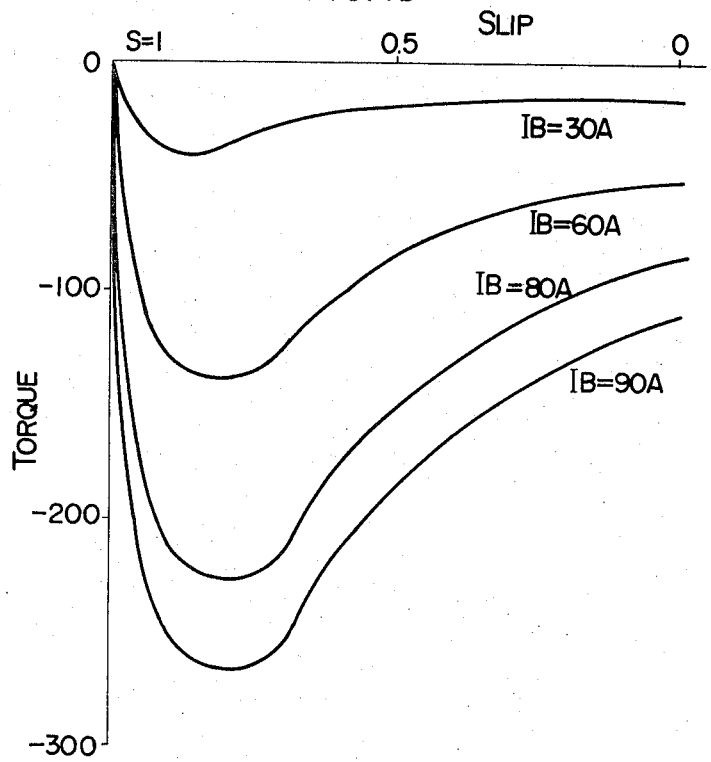

A slip vs. torque characteristic of the induction motor IM with the braking current $I_B$ taken as a parameter at the time of braking is shown in FIG. 4b. At this time, since the rectifying bridge RE consists of the series connection of the thyristors TH1 and TH2 and the series connection of the rectifying elements SR1 and SR2, it has the fly-wheel effect through the circuit $w \rightarrow d2 \rightarrow sr2 \rightarrow a2 \rightarrow SR1 \rightarrow d1 \rightarrow B2 \rightarrow v$ at the time of zero or a low value of the source voltage which is a sinusoidal alternating current to stabilize the braking torque.

When the elevator car CA reaches a point immediately before the set floor while being speed controlled following the output of the pattern generator PG in the manner described above, the stop limit switch PSU is opened. Consequently, the stop relay PS is deenergized, the contact PS1 is opened, and the start contactor coil S is deenergized. Also, the contact S5 is opened to release the electromagnetic brake coil MB. Consequently, the induction motor IM is released from the power source by the opening of the contactors S1 and S2 and, at the same time, the electromagnetic brake is operated to stop the elevator car. Futher, the braking preparatory relay BX and the braking contactor coil B are deenergized by the opening of the contacts S3 and S4 to return the sequence circuit of FIG. 2 to its original state.

Though the above description is as to the running up movement of the elevator, the running down movement of the elevator can also be made in a similar manner.

What we claim is:

1. A control system for induction motors, comprising:
   a three phase AC source;
   a three phase induction motor;
   a rectifying bridge including at least pair of thyristers;
   means for connecting an anti-parallel circuit composed of the pair of thyristors in the bridge between one terminal of the AC source and one terminal of the induction motor at the time of motoring of the induction motor; and
   means for connecting the AC side terminals of the bridge with two terminals of the AC cource and connecting the DC side terminals of the bridge with two terminals of the induction motor at the time of braking of the induction motor.

2. A control system according to claim 1, in which the rectifying bridge comprises a pair of thyristors connected in series in the same direction and a pair of rectifying element series connected in the same direction.

3. A control system according to claim 1, comprising:
   a single phase shifter for ignition controlling the pair of thyristors; and
   means for supplying the difference between two line voltages of the three phase AC source to the phase shifter at the time of motoring of the induction motor, and for supplying one line voltage of the three phase AC source to the phase shifter at the time of braking of the induction motor.

4. A control system according to claim 3, in which the means for supplying the voltage to the phase shifter comprises:
   a transformer including the secondary winding connected to the phase shifter;
   means for connecting one terminal of the primary winding of the transformer to one terminal of the three phase AC source;
   means for connecting the other terminal of the primary winding of the transformer to another terminal of the three phase AC source through a first resistor; and
   means for connecting the other terminal of the primary winding of the transformer to the remaining terminal of the three phase AC source through a make-and-break element making at the time of motoring of the induction motor and a second resistor having substantially the same resistance as that of the first resistor.

5. A control system according to claim 1, comprising:
   a pattern generator;
   means for detecting the speed of the induction motor; and
   a phase shifter for ingition controlling the thyristors in accordance with the difference between the output of the pattern generator and the detected value of the speed.

* * * * *